(12) United States Patent
Gellert et al.

(10) Patent No.: US 7,326,049 B2
(45) Date of Patent: Feb. 5, 2008

(54) CAST HOT RUNNER MANIFOLD FOR INJECTION MOLDING APPARATUS

(75) Inventors: Jobst Ulrich Gellert, Oakville (CA); Denis Babin, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 309 days.

(21) Appl. No.: 10/812,028

(22) Filed: Mar. 30, 2004

(65) Prior Publication Data

US 2004/0191358 A1    Sep. 30, 2004

Related U.S. Application Data

(60) Provisional application No. 60/458,428, filed on Mar. 31, 2003.

(51) Int. Cl.
*B29C 45/00* (2006.01)

(52) U.S. Cl. ............... 425/572; 264/328.8; 264/328.12

(58) Field of Classification Search ................ 425/572; 264/328.12, 328.8
See application file for complete search history.

(56) References Cited

U.S. PATENT DOCUMENTS

| | | | |
|---|---|---|---|
| 3,095,604 A | 7/1963 | Ackaret | ................ 425/526 |
| 3,477,097 A | 11/1969 | Plymale | |
| 3,923,209 A | 12/1975 | Roy | |
| 4,238,671 A | 12/1980 | Gellert | |
| 4,301,775 A | 11/1981 | Smart et al. | |
| 4,648,546 A | 3/1987 | Gellert | |
| 4,705,473 A * | 11/1987 | Schmidt | ................ 425/549 |
| 4,887,557 A | 12/1989 | Sukimoto et al. | |
| 5,032,078 A | 7/1991 | Benenati | ................ 425/549 |
| 5,096,411 A | 3/1992 | Gellert | |
| 5,295,806 A * | 3/1994 | Gunther | ................ 425/547 |
| 5,366,369 A | 11/1994 | Gellert | |
| 5,496,168 A | 3/1996 | Renwick | |
| 5,762,976 A | 6/1998 | Brown | |

(Continued)

FOREIGN PATENT DOCUMENTS

EP    0492296    4/1995

(Continued)

OTHER PUBLICATIONS

XINTech Hot Runner Product Information, date unknown.

(Continued)

*Primary Examiner*—Yogendra N. Gupta
*Assistant Examiner*—Maria Veronica Ewald
(74) *Attorney, Agent, or Firm*—BainwoodHuang (57) ABSTRACT

The present invention is an injection molding apparatus having a cast manifold. The manifold is made from a cast block and includes at least one pipe and a junction component fixed therein. The junction component has an axial bore having a first end and a second end, and at least one radial bore fluidly connected to the axial bore and having an opening to an outer surface of the junction component. A melt is introduced into the manifold and travels through the radial and axial bores of the junction component and through at least one pipe connected thereto to an injection molding nozzle for injection into a mold cavity. A manifold of the present invention may have a plurality of pipes and junction components to form a branched multi-level cast manifold.

32 Claims, 8 Drawing Sheets

U.S. PATENT DOCUMENTS

| | | |
|---|---|---|
| 6,149,423 A | 11/2000 | Manz |
| 6,230,384 B1 | 5/2001 | Gellert et al. |
| 6,419,476 B1 | 7/2002 | Ouellette |
| 6,460,598 B1 | 10/2002 | Adams et al. |
| 6,544,027 B2 * | 4/2003 | Yu .............................. 425/570 |
| 6,749,422 B2 | 6/2004 | Yu .............................. 425/572 |

FOREIGN PATENT DOCUMENTS

| | | |
|---|---|---|
| EP | 0480213 | 8/1995 |
| GB | 1 535 164 | 12/1978 |
| JP | 2002-011756 | 1/2002 |
| WO | WO 95/00312 | 1/1995 |

OTHER PUBLICATIONS

Unitemp Product Literature pp. 2-3 to 2-11 (Jan. 2000).

Image of Unitemp Manifold Product, date unknown.

Keoleian et al., "Life Cycle Design of Air Intake Manifolds," Research study sponsored by School of Natural Resources and Environment, University of Michigan & Ford Motor Co. (Feb. 1999).

* cited by examiner

CAST HOT RUNNER MANIFOLD FOR INJECTION MOLDING APPARATUS

RELATED APPLICATION INFORMATION

This application is a non-provisional application claiming the benefit under 35 U.S.C. § 119(e) of U.S. Provisional Patent Application No. 60/458,428 filed Mar. 31, 2003.

FIELD OF THE INVENTION

The present invention is directed to a hot runner manifold for use in an injection molding apparatus.

BACKGROUND OF THE INVENTION

The injection molding process requires that a molten thermoplastic material, or melt, be maintained in its molten state such that the melt may be injected into a mold cavity to be formed into various products. The heat profile of the melt must be maintained throughout the injection molding process in order for the melt to retain its desirable properties and thereby produce a satisfactory product. In general, the melt enters an injection molding or hot runner manifold via a bushing where it is transported to one or more injection molding or hot runner nozzles to be subsequently injected into the cooled mold cavity.

A manifold for use in a hot runner system must have certain properties. For example, the manifold must have good heat transfer characteristics and be able to withstand high temperatures and pressures. Consequently, a typical manifold is made from a block of metal with a high heat transfer coefficient.

If the manifold is formed from a block of metal, however, it becomes difficult to form melt channels within the manifold that possess appropriate geometries for efficiently and effectively transporting melt therethrough. Typically, the melt channels are made by boring holes from the outside of the metal block into its interior, usually by gun drilling techniques. As it is desirous to have multiple hot runner nozzles connected to a single manifold, the "bores" through the manifold that form the melt channels necessarily include at least one curve. Further, this curve must be rheologically balanced which is virtually impossible to achieve with standard gun drilling techniques. A rheologically balanced curve in the manifold melt channel is desirable or the melt cannot flow smoothly along the curve, which can result in either a turbulence in the melt, an obstruction of the flow or an accumulation of solidified melt along the walls of the manifold melt channel. Such turbulence may result in undesirable pressure changes in the injection molding system and heat exchange between the melt and manifold that can ruin the melt and the subsequent product formed therefrom. Further, nooks created during the gun drilling process create spaces in the manifold melt channels into which melt can get embedded causing another undesirable result. For example, the manifold melt channels may become difficult to clean between runs and/or melt hardened in the nooks may break-off and be present in subsequent molded product.

One method for forming a rheologically balanced curve within a block manifold is to intersect a bore from the side of the block and a bore from the bottom of the block to create substantially a 90° angle. A plug with a curved surface is then inserted via the side bore and placed within the manifold such that the plug's curved surface forms a more gradual curvature in the manifold channel. However, such plugs are expensive and time consuming to manufacture and assemble.

Another method of creating a rheologically balanced manifold melt channel has been to divide the manifold into an upper and lower portion, wherein half of the melt channel can be formed in a mating surface of each portion. Generally, the manifold is formed in an upper and lower portion wherein each portion has one half of a melt channel formed into a mating surface thereof. The upper and lower manifold portions are then bolted and sealed together to form rheologically balanced melt channels. However, this system requires the use of very accurate equipment.

Another challenge in utilizing a metal block for a hot runner manifold is that it can be difficult to uniformly heat the manifold melt channels therein. Typically, a heater is attached to the exterior of the block, and in some instances it can be brazed or pressed into a heater channel. This is a time consuming process, as it requires the machining of the heater channel which has a complicated contour.

Uniform heating of a manifold may be created by utilizing an internal heater disposed in a split-block manifold, such as that described above. In this case, the heater is placed in a special bore between the upper and lower portions of the manifold along the melt channels.

Another solution for creating a manifold with rheologically balanced melt channels and uniformly heating the melt channels includes the use of pre-formed pipes with a rheological curve. However, it is difficult to effectively heat pipes without placing them in a thermoconductive medium. Oil or gas mediums have been tried to effectively heat the melt channels. However, the safety and effectiveness of such an approach is questionable especially if oil, due to its flammability, is used as the thermoconductive medium.

Other embodiments use pipes that are either unitarily formed or cut and welded together to create smooth passages. However, seams between the two pipes may be weak and break at high temperatures and pressures and may cause the manifold to malfunction.

Thus, it is desirous to have an injection molding hot runner manifold with a manifold melt channel and integral heating system that solves the above-identified problems.

BRIEF SUMMARY OF THE INVENTION

The present invention is directed to a hot runner apparatus comprising a sprue bushing, a hot runner manifold, and a nozzle. The hot runner manifold comprises at least one pipe and a junction fixed within a block, such as a cast block. The junction generally has an axial bore having a first end and a second end. The junction also has at least one radial bore with at least one opening to the outside of the junction and which intersects the second end of the axial bore. The first end of the axial bore engages the sprue bushing. The opening of the radial bore of the junction is fluidly connected to a first end of the pipe. A nozzle is attached to a second end of the pipe. The pipe has at least one bend. By this design, the pipe is attached to the junction to provide smooth flow of melt material therein.

In another embodiment, the manifold comprises a radial pipe fixed within the manifold block having a first and second end and a nozzle pipe fixed within the manifold block having a first and second end. The first end of the radial pipe engages an opening of a radial bore in the junction, and the second end of the radial pipe engages the first end of the nozzle pipe, such that one of the first end of the nozzle pipe or the second end of the radial pipe is telescopically slidable inside the other. The second end of the nozzle pipe is in fluid communication with a melt channel of a hot runner nozzle. Therefore, the slidable arrangement between the radial and nozzle pipes allows adjustment of the distance between the junction and a hot runner nozzle, for example prior to casting of the manifold block.

In another embodiment, the manifold also includes a valve pin extending through a hot runner nozzle. The valve pin extends through at least one support pillar fixed within the manifold block that extends the entire height of the manifold block, wherein the valve pin is supported by the support pillar. The valve pin is connected to an actuation unit disposed outside of the manifold block to control the movement of the valve pin.

In another embodiment, the manifold further includes a heating element fixed within the manifold block. The heating element may be a coil surrounding at least one of the radial or nozzle pipes, the junction and/or the support pillar. Alternatively, the heating element may be a coil wrapping at least one full time around the radial and/or nozzle pipe(s).

In the present invention, a pipe for forming a manifold melt channel is made of a metal or metal alloy capable of withstanding high temperatures and pressures, such as stainless steel. In the present invention, the manifold block is made from a soft thermally conductive metal, such as bronze, brass or a combination thereof. In the present invention, the junction and the support pillar are made from a tool steel with a high melting point, such as H13 tool steel.

A heating means according to the present invention comprises a copper wire, which can be coiled at least one time around the junction, the support pillar, and/or at least one of the radial or nozzle pipes. Alternatively, the copper wire is coiled at least one time around the radial and nozzle pipes.

In another embodiment, a plurality of pipes are connected to the junction for channeling a melt from a sprue bushing through the manifold to a plurality of hot runner nozzles.

In yet another embodiment, the support pillar is coupled with the nozzle pipe adjacent to where the hot runner nozzle is fluidly attached to the manifold.

In yet another embodiment, the pipe connected to the junction leads to a branching junction with branching pipes engaged thereto to form a multi-level manifold block.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art or arts based on the teachings contained herein.

BRIEF DESCRIPTION OF THE FIGURES

The present invention will be described with reference to the accompanying drawings.

DETAILED DESCRIPTION OF THE INVENTION

Figure 1:
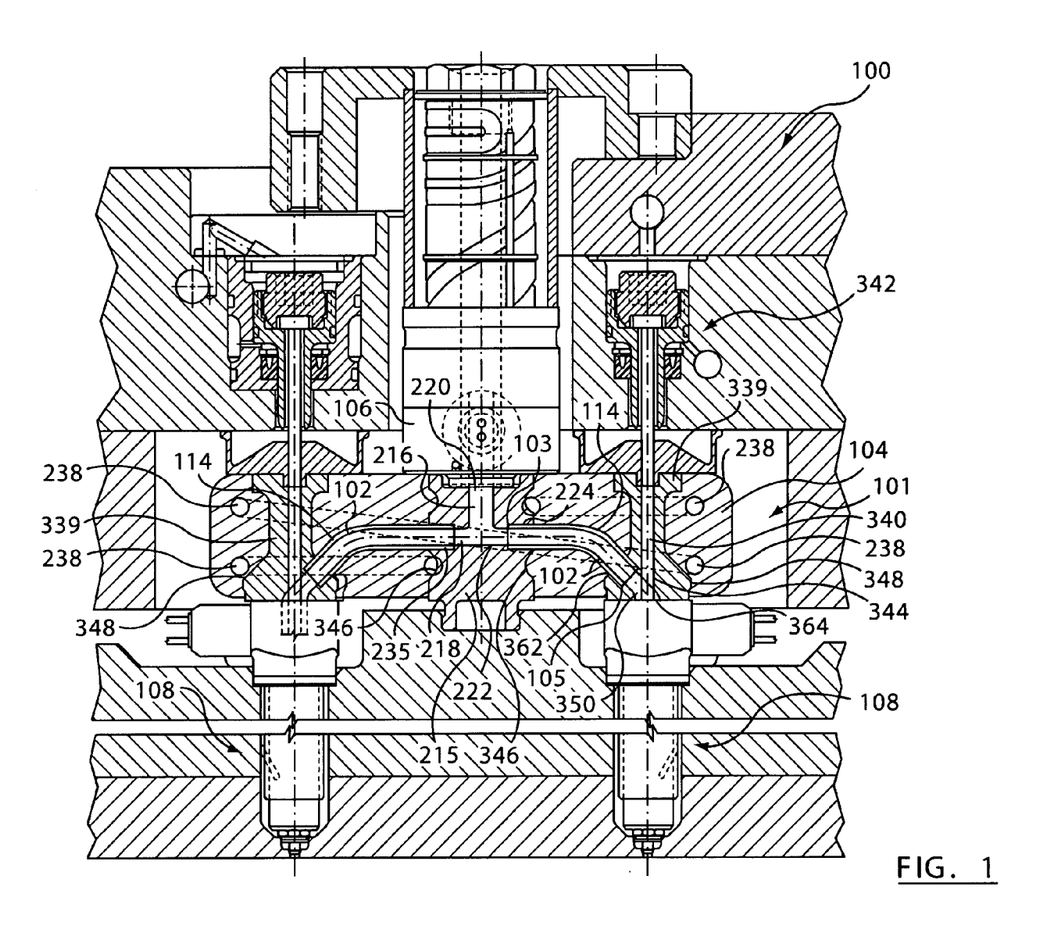
FIG. 1 is a schematic side view of a hot runner apparatus according to an embodiment of the present invention.

FIG. 1 is a schematic side view of a hot runner apparatus 100 according to one embodiment of the present invention. This apparatus includes a sprue bushing 106, a hot runner manifold 101, and a nozzle 108. Manifold 101 is generally a manifold block 104 into which various components are cast. Manifold block 104 is made from a conductive metal, such as copper or copper alloys, such as brass or bronze, aluminum or aluminum alloys, certain steel or steel alloys, a combination thereof or another material that may be apparent to one skilled in the art. Manifold 101 is made by pressure casting, investment casting and other suitable casting methods that allow formation of a solid body. One component that is cast into manifold 101 is a junction 215. Junction 215 is made of tool steel, preferably H13 steel, or another such material that can maintain its form during the cast process without melting, bending or deforming.

In an embodiment of the present invention, junction 215 is formed of a sold block of material with a axial bore 216 and at least one radial bore 218. Axial bore 216 and radial bore 218 are formed injunction 215 prior to it being cast into manifold 101. The bores may be formed by gun-drilling or other techniques known in the art, such as those used to bore channels in conventional manifolds.

Axial bore 216 of junction 215 has a first end 220 open to an outer surface of junction 215. Axial bore first end 220 is in fluid communication with a sprue bushing 106 disposed on or adjacent an outer surface of manifold 101. Axial bore 216 also has a second end 222, which extends into an interior of junction 215. Radial bore 218 has an opening 224 at another outer surface of junction 215.

Radial bore 218 generally extends through a radial length of junction 215 and intersects with second end 222 of axial bore 216. In one embodiment having two hot runner nozzles as shown in FIG. 1, radial bore 218 extends through the entire radial length of junction 215, such that it has two openings 224 in opposing outer surfaces of junction 215.

Opening 224 of radial bore 218 engages a first end 103 of a pipe, or tube, 102. Pipe 102 has a second end 105 and includes one bend 114 between its first end 103 and its second end 105. Preferably the bend 114 is a Theologically balanced bend, which is a bend that allows for low turbulent flow through the channel. A rheologically balanced bend provides an accurate, fast and optimum turn from one level in the manifold to another level.

Pipe 102 is preferably made from a strong and smooth stainless steel, but can be made of any metal that can maintain its form during the casting process without melting, bending or deforming.

Junction 215 is structured such that pipe 102, which is also embedded in manifold block 104, is fluidly connected to sprue bushing 106 without the need for a second bend. Further as shown in the embodiment of FIG. 1, junction 215 provides a supportive connection for two pipes 102. As would be clear to one skilled in the relevant art, a manifold having a stable and supportive junction 215 is an improvement over a manifold having a plurality of unsupported pipes forming the manifold melt channels, wherein each pipe necessarily includes at least two bends in order to achieve flow of melt through the manifold to the nozzle.

In one embodiment of the present invention, pipe 102 is inserted into a pipe bore 235 formed in junction 215. Pipe bore 235 is larger than a diameter of radial bore 218 by the thickness of pipe 102 such that an interior surface of pipe 102 is flush with an interior surface of radial bore 218. Pipe 102 is fixed to junction 215, such as by brazing, or another mechanical method known to those skilled in the relevant art. Consequently, junction 215 provides a stable and supportive platform for pipe 102 before, during and after the casting process.

The embodiment of the invention shown in FIG. 1 includes valve-gated hot runner nozzles 108 each having a valve pin 340. Each valve pin 340 is supported within an interior of manifold 101 by a support pillar 339. Support pillar 339 is also made of tool steel, preferably H13 steel, or another such material that can maintain its form during the casting process without melting, bending or deforming. Support pillar 339 includes a axial bore 344 extending along a longitudinal axis thereof that acts as a passageway and a bearing surface for valve pin 340. Valve pin 340 extends through manifold 101 via axial bore 344 to an actuating unit 342. Actuating unit 342 moves valve pin, 340 up and down in order to open and close hot runner nozzle 108, thereby controlling the flow of melt into a mold cavity (not shown).

Use of support pillar 339 in cast manifold 101 for valve-gated injection molding applications assures continued proper alignment of valve pin 340 and thereby proper functioning of valve-gated nozzle 108. Although a simple bore through a cast manifold may be sufficient to house a valve pin, the repetitive movement of a valve pin during the injection molding process would cause excessive wear of softer cast materials, such as copper or aluminum, and thereby ruin proper alignment of the valve pin and function of the valve-gated nozzle. In addition, support pillars 339 protect the valve pins from pressure and bending forces that occur during operation of the manifold. Support pillars 339 are not limited to the shape or size shown in FIG. 1, but are suitable in a variety of desirable shapes.

The embodiment of the present invention shown in FIG. 1 includes a manifold heater 238. In this embodiment manifold heater 238 is a coiled wire protected by an external cover, which surrounds support pillars 339, junction 215 and pipes 102. The position of manifold heater 238 within manifold 101 provides a uniform distribution of heat throughout manifold 101 which is then transferred to a thermoplastic melt within pipes 102. Other types of manifold heaters can be used in this invention, such as cartridge heaters, film heaters, heat pipes, and others as would be apparent to one skilled in the relevant art. In another embodiment, heater 238 may coil around one or more individual pipes 102 to directly heat the melt material flowing therein. In another embodiment of the present invention, more than one heater can be cast into manifold 101.

In certain embodiments of the present invention, support pillars 339 and junction 215 also function to support heater 238 before and during the casting process. In such an embodiment, junction 215 includes locating grooves 346, which hold heater 238 in place. Support pillar 339 may include similar locating grooves or instead, as shown in FIG. 1, include a ledge 348 on which heater 238 rests.

As shown in FIG. 1 of the present invention, second end 105 of pipe 102 is inserted into a first end 362 of a second bore 350 in support pillar 339. Second bore 350 has a second end 364 that opens to an exterior surface of manifold 101 where hot runner nozzle 108 is fluidly connected to manifold 101. Thus, support pillar 339 also provides support and stability to pipe 102 before and during the manifold casting process, as well as during operation of the manifold in the injection molding process.

Figure 2:
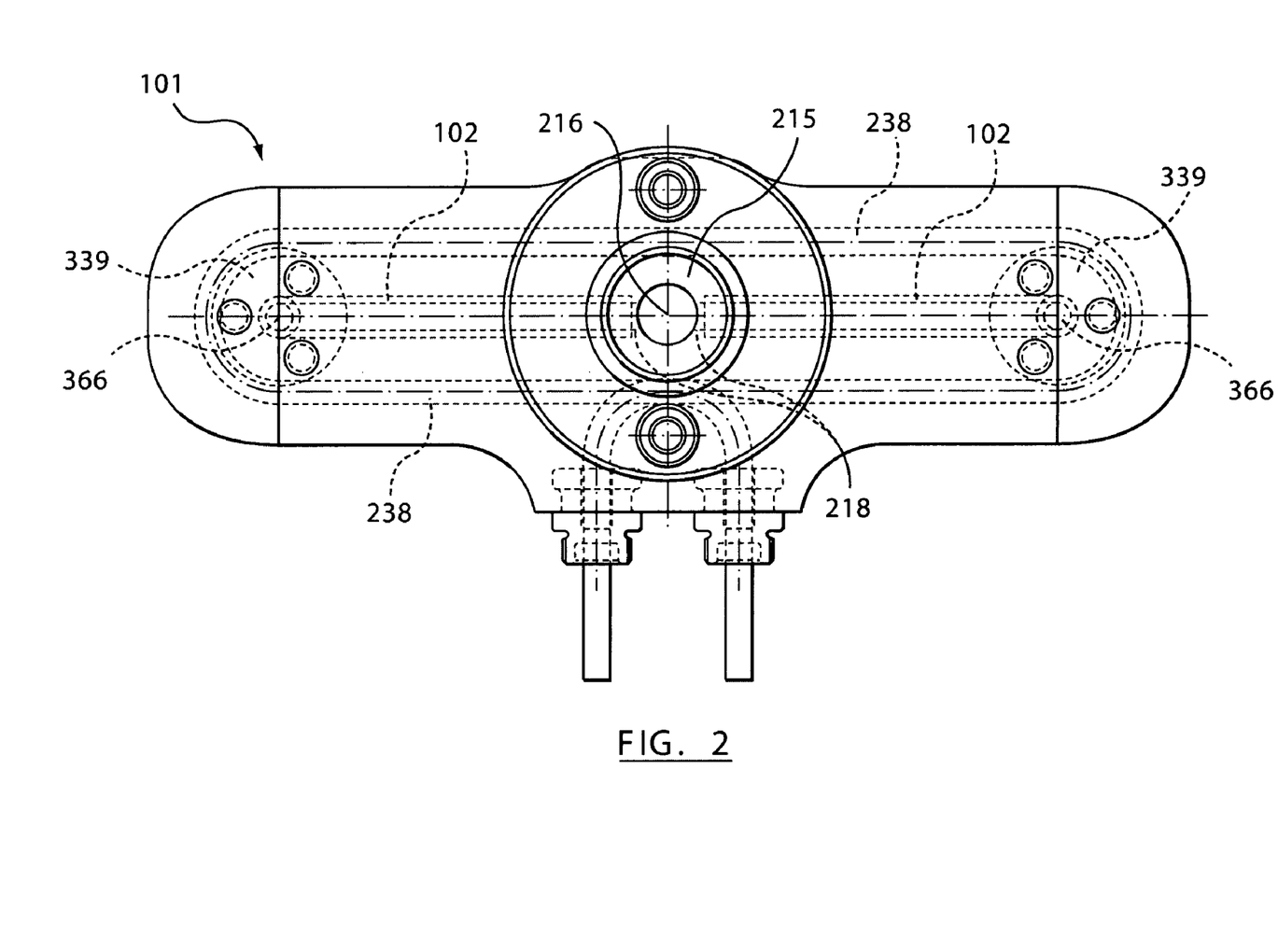
FIG. 2 is a schematic planar view of the hot runner manifold of FIG. 1.
Figure 3:
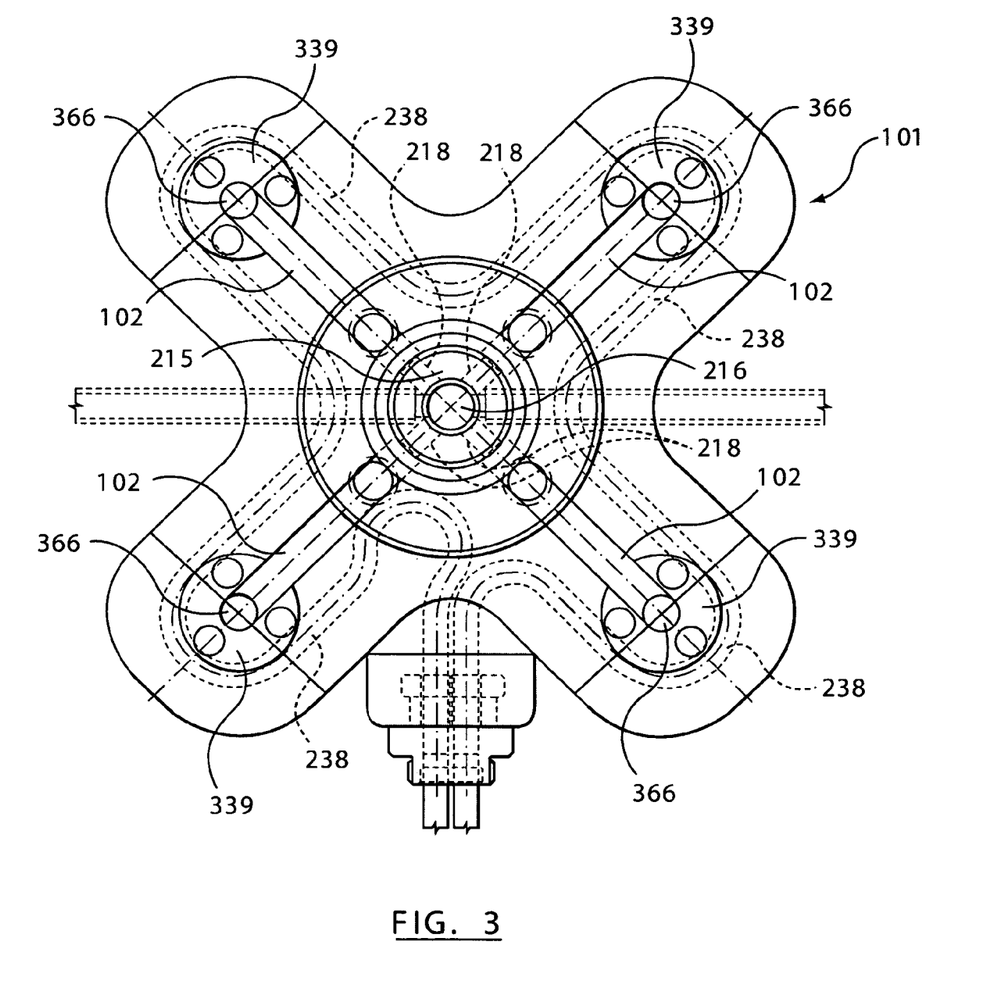
FIG. 3 is a schematic planar view of a hot runner manifold according to another embodiment of the present invention.
Figure 4:
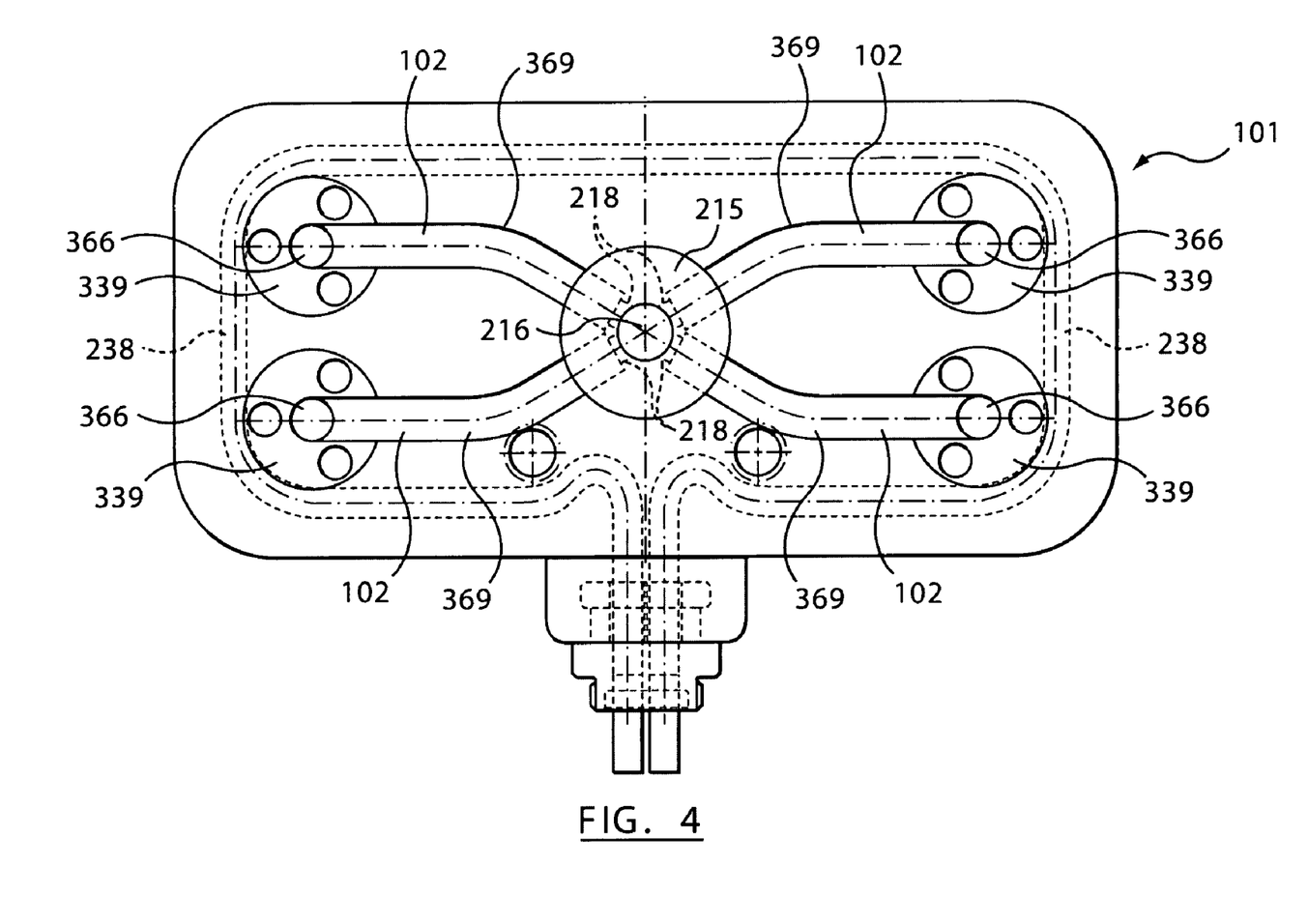
FIG. 4 is a schematic planar view of a hot runner manifold according to another embodiment of the present invention.

FIG. 2 is a schematic planar view of manifold 101 in FIG. 1. As shown, manifold 101 includes two nozzle drops 366. Thus only two pipes 102 are necessary. FIGS. 3 and 4 are schematic planar views of manifold 101 according to further embodiments of the present invention wherein four nozzle drops 366 that require four pipes 102 are shown. Ideally, a distance between where the melt from sprue bushing 106 enters the manifold at junction axial bore 216 and exits the manifold at nozzle 108 is of exactly equal distance for each melt pathway. Thus, junction 215 provides a central axis of the manifold and a guiding and alignment center for the entire manifold. A plurality of nozzle drops can be used in the present invention, provided that junction 215 has a sufficient number of radial bores 218 to accommodate each additional pipe 102.

The manifold of FIG. 3 has four equally spaced nozzle drops 366 and the manifold 101 is of an X-shape. In FIG. 4 the manifold 101 is of a rectangular shape (i.e., generally having a length, a width, and a height) and has four nozzle drops 366 that are not evenly spaced. Each of nozzle drops 366 shown in FIG. 4 is closer to one adjacent nozzle drop 366 than it is to the remaining nozzle drops 366. Further, in addition to a bend 114 in the direction of the height of the manifold 101, pipes 102 in the embodiment of FIG. 4 also have a bend 369 in the direction of the width of the manifold. This embodiment permits the nozzles to be positioned at the corners of a rectangular-shaped manifold which saves space. As evidenced by the various manifold designs shown in FIGS. 2-4, manifolds constructed according to the present invention may be adapted for a wide range of injection molding applications and are contemplated to fall within the scope of the present invention.

Figure 5:
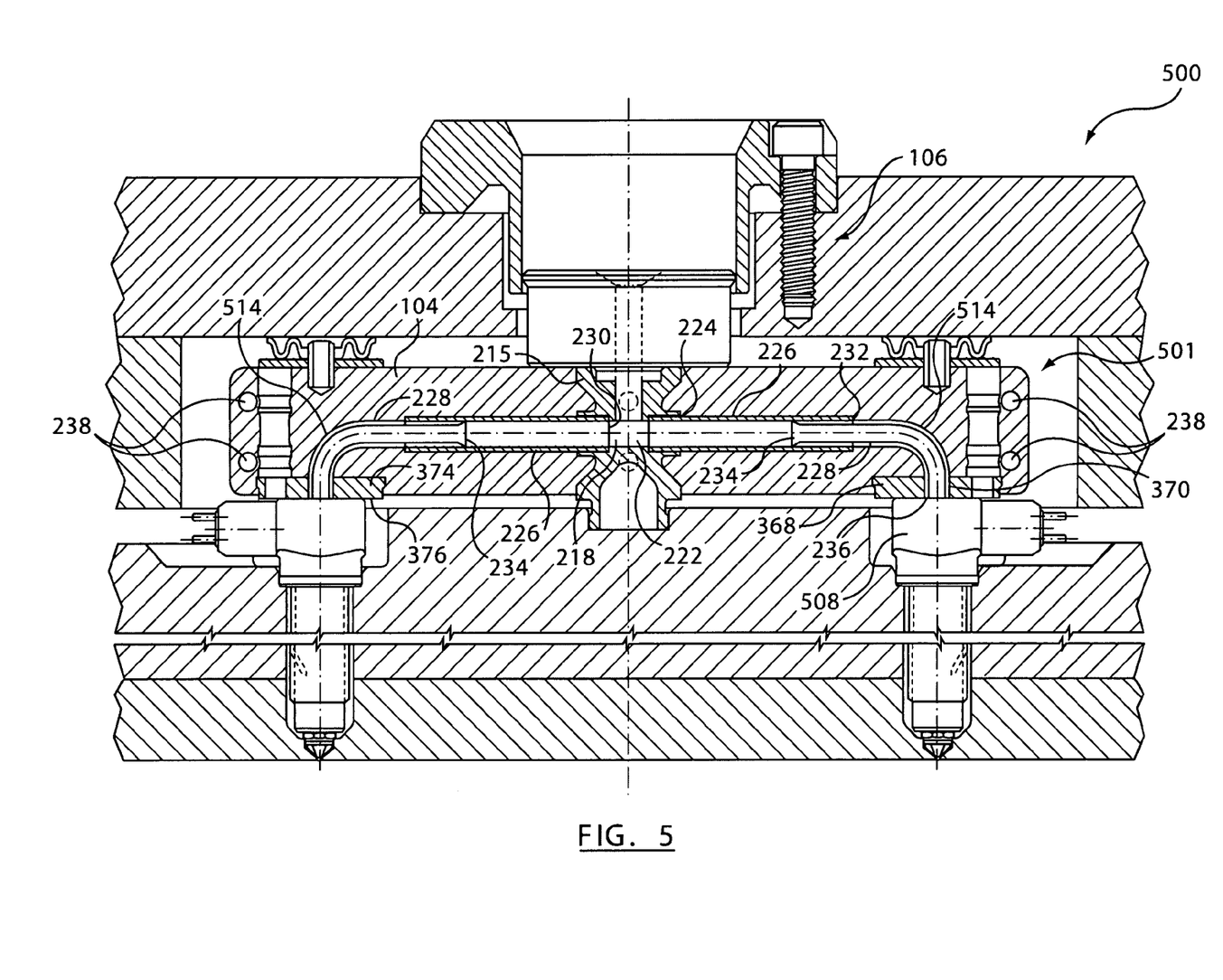
FIG. 5 is a schematic side view of a hot runner apparatus according to another embodiment of the present invention.

FIG. 5 is a schematic side view of a hot runner apparatus 500 according to another embodiment of the present invention. In this embodiment, a junction 215 of a manifold 501 is connected to a first end 230 of a radial pipe 226. Radial pipe 226 is preferably a straight pipe as shown in FIG. 5, but it may have a bend as may be suitable in certain applications. A second end 232 of radial pipe 226 is slidably connected to a first end 234 of a nozzle pipe 228. Nozzle pipe 228 may comprise at least one bend 514, as shown in FIG. 5. FIG. 5 shows a bend 514 which is almost 90 degrees while that of FIG. 1 is much less aggressive of a bend 114. Thus, a bend according to the present invention may be of any degree or shape provided that it creates a melt flow with a smooth transition from one level to the other.

In the embodiment of the present invention shown in FIG. 5, first end 234 of nozzle pipe 228 is inserted within second end 232 of radial pipe 226. Alternatively, second end 232 of radial pipe 226 may be formed to be inserted within first end 234 of nozzle pipe 228. Radial pipe 226 and nozzle pipe 228 may have different cross sectional diameters and may be made of different materials. A single pipe, as shown in FIG. 1, will necessarily require a higher precision in manufacturing and assembly.

The slidable relationship between the radial and nozzle pipes allows the pitch between two nozzles to be adjusted to suit a particular application prior to casting manifold 501. Further, once the position of the pipes relative to one another is determined, the pipes may be locked into place, via brazing, welding or another form of mechanical attachment know to one skilled in the relevant art. However, it is contemplated that radial pipe 226 and nozzle pipe 228 may also remain minimally movable with respect to each other after manifold 501 has been cast. Relative movement between radial pipe 226 and nozzle pipe 228 will allow the melt channel formed by the pipes 226, 228 to withstand deformation caused by the inherent lateral movement that the entire manifold experiences during thermal expansion.

In another embodiment (not shown), a single radial pipe may be extended the entire way through a junction. A nozzle pipe is then slidingly connected to each end of the single radial pipe. In this embodiment the radial pipe may be inserted into a radial bore of the junction before a axial bore has been made therein. Consequently, when the axial bore is formed in the junction, the radial pipe will also be bored. However, a bore may be made in the radial pipe prior to its insertion into the junction to provide fluid connection between the axial bore and the single radial pipe, which subsequently requires careful alignment of these components.

The embodiment of the present invention shown in FIG. 5 does not include support pillars to support and align the nozzle pipes. Instead, a second end 236 of nozzle pipe 228 is inserted into a connector disk 368. Connector disk 368 is used to support second end 236 of nozzle pipe 228 before, during and after casting of manifold 501. Also, connector disk 368 may be used to connect a nozzle 508 to manifold 501. Connector disk 368 has a first surface 374 that contacts manifold 501 and a second surface 376 that is in sliding contact with nozzle 508.

Connector disk 368 has a central bore 370 into which nozzle pipe 228 is inserted. Preferably, nozzle pipe 228 is fixed to connector disk 368, such as by brazing, welding, or another mechanical attachment as would be apparent to one skilled in the relevant art, prior to casting of manifold 501. However, an outer diameter of nozzle pipe 228 may be made to have a friction fit with connector disk central bore 370 such that it will be held in an appropriate position during casting without having to be attached.

A connector disk may be used to anchor pipe 102 in the embodiment of the present invention shown in FIG. 1. Further, support pillar 339 as shown in the embodiment of FIG. 1 may be connected to a connector disk prior to casting manifold 101. Connector disk 368 may be made of tool steel, preferably H13 steel, or another such material that can maintain its form during the cast process without melting, bending or deforming. Connector disk 368 can be made in a variety of shapes.

Figure 6:
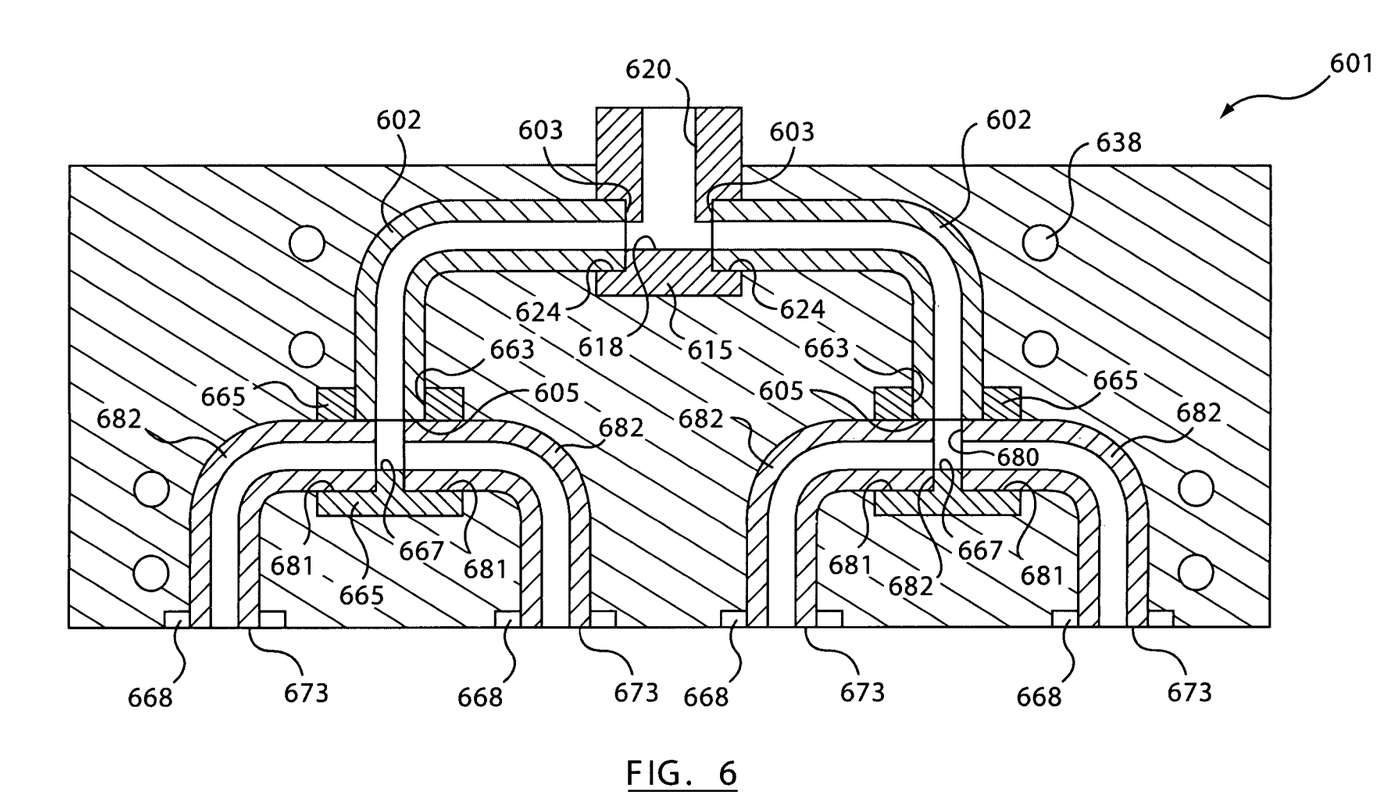
FIG. 6 is a schematic cross-section of a manifold of a hot runner apparatus according to another embodiment of the present invention.
Figure 7:
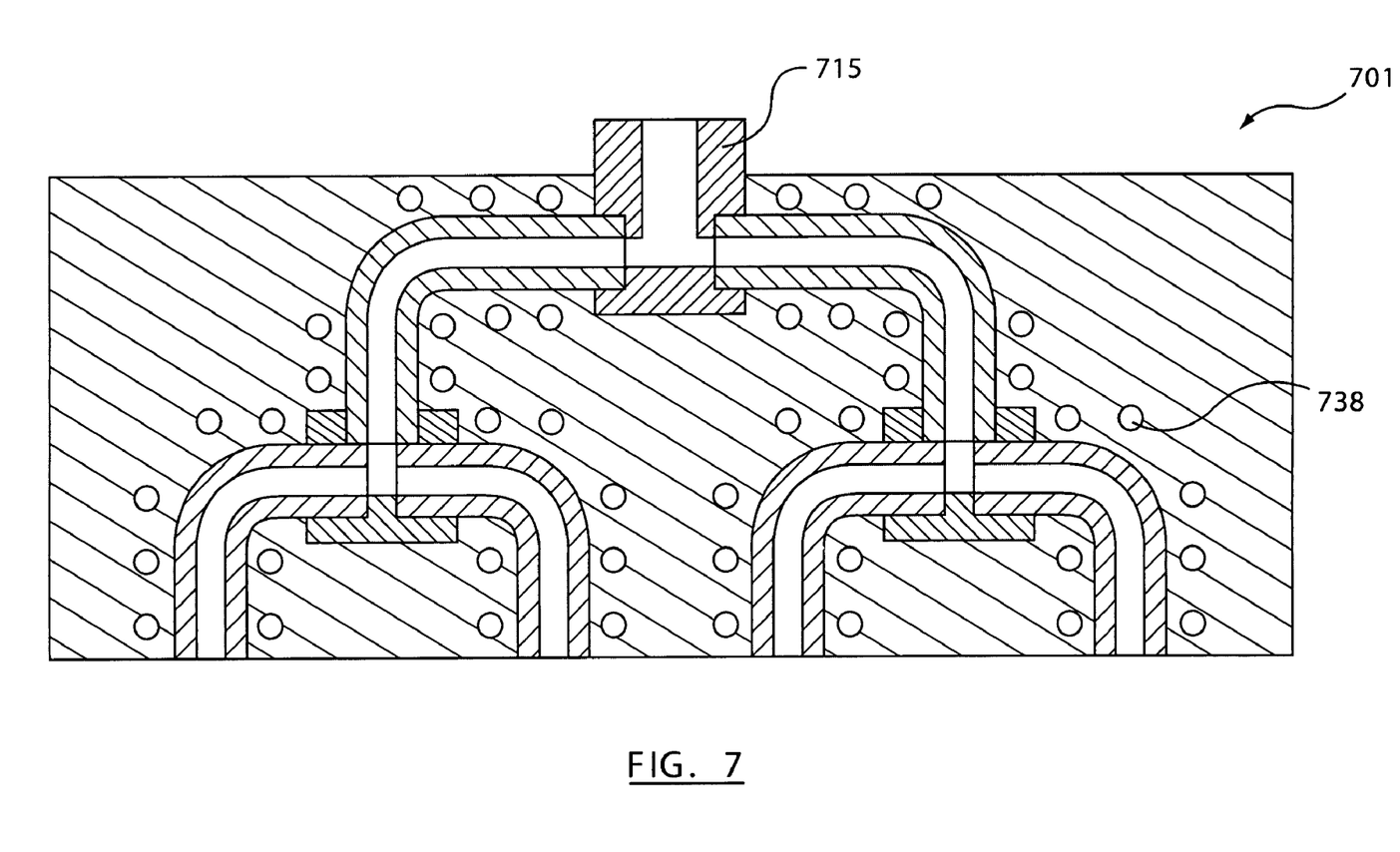
FIG. 7 is a schematic cross-section of a manifold of a hot runner apparatus according to another embodiment of the present invention.
Figure 8:
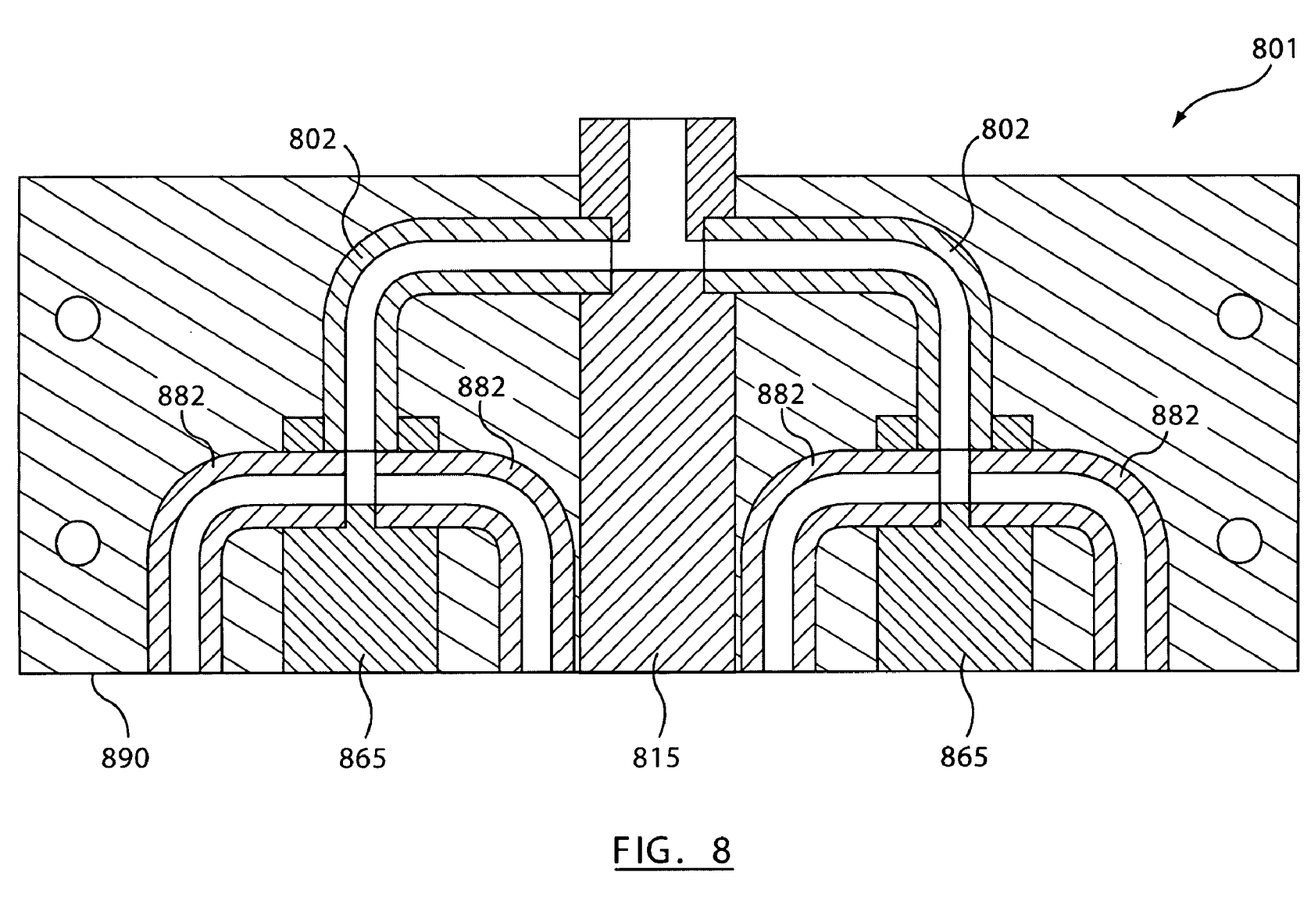
FIG. 8 is a schematic cross-section of a manifold of a hot runner apparatus according to another embodiment of the present invention.

Another embodiment of the present invention is a multi-level manifold having branched mold channels formed by a plurality of pipes and a plurality of junctions as generally illustrated in FIGS. 6-8. Further, the pipes and junctions shown in FIGS. 6-8 can be arranged in a variety of formations to create custom manifolds.

In particular, FIG. 6 shows a manifold 601, which is cast as described above. However, manifold 601 includes multiple layers of pipes and a plurality of junctions. Manifold 601 includes a center junction 615, having a axial bore 620 and a radial bore 618. In the embodiment shown in FIG. 6, radial bore 618 has two openings 624 which engage first ends 603 of pipes 602, similar to that described in FIG. 1. However, these pipes 602 also have second ends 605 which each engage an axial bore 663 of branching junctions 665. Further, branching junctions 665 each have a radial bore 667 therethrough. Openings 681 in radial bore 667 engage a first end 680 of branching pipes 682. Openings 681 are bored larger than radial bore 667 to form a shoulder, which aligns first end 680 of branching pipes 682 with the second end 605 of pipes 602, to allow melt material to flow smoothly from pipe 682, through branching junction 665 and into branching pipes 682. The second ends 673 of pipes 682 are inserted into connector disks 668, such as nozzle pipes 228 in FIG. 5, to support branching pipes 682 before, during and after casting of manifold 601.

FIG. 6 also shows manifold 601 including a heater 638. Heater 638 is a coil wrapped entirely around the pipes and junction arrangement, as shown in FIG. 6. FIG. 7 shows an alternative cast manifold 701 having the same pipes and junctions configuration as FIG. 6, but having a heater 738 that is wrapped around each pipe rather than around the entire pipes and junctions configuration. Wrapping the heater 738 around each pipe directs the heat towards the pipes to better control the temperature of the melt material therein. Heater 738 may be a single coil with leads (not shown) extending outside of manifold 701, or, in the alternative, may comprise a plurality of coils, such as one for each pipe, each of which including separate leads (not shown) extending outside of manifold 701.

FIG. 8 illustrates yet another embodiment of a manifold 801 of an injection molding apparatus of the present invention. In this case, center junction 815 extends along the entire height of manifold 801 in order to provide support to the pipes 802 before, during and after casting. Also, branching junctions 865 extend to a downstream surface 890 of the manifold 801 to provide similar support before, during and after casting to branching pipes 882.

Further, each of the junctions 615, 715 and 815, shown in FIGS. 6-8 as extending outside of the manifold outer surface, may also function as a sprue bushing, similar to that of sprue bushing 106 of FIGS. 1 and 5.

The modular nature of the components used to form the melt channels of a manifold according to the present invention provides for simplicity and flexibility in designing, modifying and manufacturing the manifold. For example, pre-manufactured components can be conveniently stored for a wide range of applications where the only variables are the number of nozzle drops, the distance between the nozzle drops and the overall size of the manifold, which usually depends on the spacing and number of nozzle drops.

Once the desired components have been removed from stock, purchased or manufactured, the manifold may be manufactured according to the following method. An injection pressure mold is made according to the final size desired of the manifold. The injection pressure mold is also a cast piece, which is positioned adjacent to the source of molten metal. The various components are then coupled together. For example, with respect to manifold 101 and 501 illustrated in FIGS. 1 and 5, respectively, the support pillars 339 and/or connector disks 368 are positioned. The second ends of pipe 102 or nozzle pipe 228 are then secured to support pillars 339 and/or connector disks 368. The first end of pipe 102 or radial pipe 226 are securely attached to the junction 215 by being pressed in, threaded, brazed or welded thereto. In another embodiment, the radial pipe 226 and nozzle pipe 228 are slidably engaged. With respect to the multi-level manifolds of FIGS. 6-8, the pipes and junctions are similarly configured prior to being placed into the injection pressure mold.

The assembled manifold components are then placed within the injection pressure mold, such that the location of the components complements the desired final location of nozzles 108/508. One or more heaters are then located around the manifold components as desired. Once manifold components and the heater are assembled within the injection pressure mold, the mold is preheated. Then the molten metal is injected under pressure to fill the mold and provide manifold 101 or 501 of the present invention. In one method of manufacturing the cast manifold, the molten metal of the manifold is poured into the injection pressure mold and a hydraulic press is used to apply high pressure until the cast material is solidified. For example, when brass is used as the manifold metal, brass can be added to the mold at temperatures between 1400° F. and 1800° F., preferably around 1650° F., and around 13-25 tons of pressure per square inch may be applied, preferably between 16 and 20 tons per square inch. However, various materials may require very different casting conditions.

Further, as discussed above, other methods of casting a manifold of the present invention may be used as would be apparent to one skilled in the art, such as investment casting.

According to another aspect of the invention the melt channel tubes are internally coated with protective layers. For example, coatings that reduce the corrosive action of the melt on the pipe are especially needed for glass filled resins or other abrasive materials. Other coatings such as low friction coatings can be used to reduce the heat generated by the friction between the melt and the wall of the melt channel tubes. For example, sol-gel and graphite layers can be used for certain resins. These types of coatings are difficult or near impossible to provide in a gun-drilled melt channel.

Other items may be cast into a manifold made according to the present invention, such as connectors, guiding bushings, and process sensors, supports, and thermocouples, as would be apparent to one skilled in the relevant art.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An injection molding apparatus, comprising:
    a manifold including,
        a cast manifold block,
        a junction component fixed in the manifold block and having an axial bore with a first end opening to an exterior surface of said manifold block for receiving a flow of melt material, and at least one radial bore in fluid communication with the axial bore and having at least one opening to an outer surface of said junction component, and
        at least one pipe fixed in the manifold block, wherein said at least one pipe has a first end that engages said junction component at the at least one opening of said radial bore, said junction component and said at least one pipe defining a manifold channel for directing the flow of melt material;
            wherein the junction component and the at least one pipe are separate pieces that the manifold block has been cast around, and
        a nozzle defining a nozzle channel in fluid communication with the manifold channel for receiving the flow of melt material through said at least one pipe.

2. The apparatus of claim 1, wherein said at least one pipe has at least one bend.

3. The apparatus of claim 1, wherein the manifold further includes at least one nozzle pipe fixed in the manifold block and having a first end engaging a second end of said at least one pipe and located intermediate the at least one pipe and the nozzle, said nozzle pipe defining the manifold channel with the at least one pipe and the junction component.

4. The apparatus of claim 3, wherein one of said first end of said nozzle pipe and said second end of said at least one pipe is telescopically slidable inside the other of said first end of said nozzle pipe and said second end of said at least one pipe, whereby the distance between said junction component and said nozzle is adjustable prior to casting.

5. The apparatus of claim 1, wherein the manifold further includes:
    at least one support pillar component fixed in said manifold block, said support pillar component defining an axial bore and extending a height of said manifold block; and
    a valve pin extending and retracting through said manifold via said axial bore of said support pillar component and into said nozzle channel.

6. The apparatus of claim 5, wherein said valve pin is connected to an actuation unit disposed outside of said manifold.

7. The apparatus of claim 5, wherein said support pillar component is coupled to said at least one pipe.

8. The apparatus of claim 1, wherein said manifold further includes a heating element fixed in said manifold block.

9. The manifold of claim 8, wherein said heating element comprises a copper wire.

10. The apparatus of claim 8, wherein said heating element is a coil surrounding a configuration of at least said junction component engaged with said at least one pipe.

11. The apparatus of claim 8, wherein said heating element is a coil wrapping at least one full time around said at least one pipe.

12. The apparatus of claim 8, wherein said manifold further includes a plurality of heating elements.

13. The apparatus of claim 1, wherein said manifold further includes:
    at least one branching junction component fixed within said manifold block and having an axial bore with a first end engaging a second end of said at least one pipe and at least one radial bore in fluid communication with said axial bore with at least one opening to an outer surface of said branching junction component, and
    at least one branching pipe, wherein said at least one branching pipe has a first end that engages said at least one opening of said radial bore of the branching junction component.

14. The apparatus of claim 13, wherein said junction component and said branching junction component support said at least one pipe and said at least one branching pipe before, during and after said manifold block is cast.

15. The apparatus of claim 1, wherein said at least one pipe is made of stainless steel.

16. The apparatus of claim 1, wherein said manifold block is made from a soft thermally conductive metal.

17. The apparatus of claim 16, wherein said manifold block is made from a material selected from the group consisting of copper, copper alloys, bronze, brass, aluminum, aluminum alloys, steel, steel alloys and combinations thereof.

18. The apparatus of claim 5, wherein said junction component and said support pillar component are made from a tool steel with a high melting point.

19. The apparatus of claim 18, wherein at least one of said junction component and said support pillar component are made from H13 tool steel.

20. The apparatus of claim 1, wherein said junction component includes a plurality of radial bores defining a plurality of openings to the outer surface of said junction component and wherein said manifold further includes a plurality of pipes, such that each of said plurality of pipes is fluidly connected to one of said plurality of openings.

21. The apparatus of claim 1, wherein said first end of said axial bore of said junction component is in fluid communication with a sprue bushing.

22. The apparatus of claim 1, wherein said junction component is a sprue bushing.

23. An injection molding apparatus, comprising:
   a manifold including,
      a manifold block,
      a junction component fixed in the manifold block and having an axial bore with a first end opening to an exterior surface of said manifold block for receiving a flow of melt material, and a radial bore in fluid communication with the axial bore and having an opening to an outer surface of said junction component,
      a radial pipe fixed in the manifold block and having a first end engaging the junction component at the opening of said radial bore, and
      a nozzle pipe fixed in the manifold block and having a first end engaging a second end of said radial pipe, one of said first end of said nozzle pipe and said second end of said radial pipe being telescopically slidable inside the other,
      the junction component, radial pipe and nozzle pipe defining a manifold channel for directing the flow of the melt material through said block; and
   a nozzle defining a nozzle channel in fluid communication with said manifold channel for receiving the flow of melt material.

24. The apparatus of claim 23, wherein said manifold block is a cast block.

25. The apparatus of claim 23, wherein at least one of the pipes has at least one bend.

26. The apparatus of claim 23, wherein said manifold further includes a heating element fixed in said manifold block.

27. The apparatus of claim 23 wherein the manifold further includes a connector disk having a central bore into which a second end of the nozzle pipe is inserted, the connector disk having a first surface that contacts the manifold block and an opposite surface that contacts an end of the nozzle.

28. An injection molding apparatus, comprising:
   a manifold including,
      a manifold block,
      a junction component fixed in the manifold block and having an axial bore with a first end opening to an exterior surface of said manifold block for receiving a flow of melt material, and at least one radial bore in fluid communication with the axial bore and having at least one opening to an outer surface of said junction component,
      at least one pipe fixed in the manifold block, wherein said at least one pipe has a first end that engages said junction component at the at least one opening of said radial bore, the junction component and at least one pipe defining a manifold channel for the flow of melt material, and
      at least one support pillar component coupled to said at least one pipe and fixed in said manifold block, said support pillar component defining an axial bore and extending a height of said manifold block,
      wherein the junction component, the at least one pipe, and the at least one support pillar are separate pieces that the manifold block has been cast around;
   a nozzle defining a nozzle channel in fluid communication with the manifold channel for receiving the flow of melt material, and
   a valve pin retractably extending through said manifold block via said axial bore of said support pillar component and into said nozzle channel.

29. The apparatus of claim 28, wherein said manifold block is a cast block.

30. The apparatus of claim 28, wherein said at least one pipe has at least one bend.

31. The apparatus of claim 28, wherein said valve pin is connected to an actuation unit disposed outside of said manifold.

32. The apparatus of claim 28, wherein said manifold further includes a heating element fixed in said block.

* * * * *